(12) United States Patent
Song et al.

(10) Patent No.: US 7,843,619 B1
(45) Date of Patent: Nov. 30, 2010

(54) SCANNER MOTOR

(75) Inventors: Sang Jae Song, Gyunggi-do (KR); Woo Chul Shin, Gyunggi-do (KR); Young Jin Bae, Gyunggi-do (KR); Song Bon Oh, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/566,563

(22) Filed: Sep. 24, 2009

(30) Foreign Application Priority Data

Jul. 6, 2009 (KR) ..................... 10-2009-0061226

(51) Int. Cl.
*G02B 26/08* (2006.01)
(52) U.S. Cl. ..................................... 359/216.1; 310/90
(58) Field of Classification Search .............. 359/198.1, 359/200.1, 216.1–218.1; 310/67 R, 90, 91
See application file for complete search history.

(56) References Cited

U.S. PATENT DOCUMENTS 4,820,005 A * 4/1989 Hashimoto et al. ....... 359/218.1
5,124,830 A * 6/1992 Omura et al. ............ 359/226.2

FOREIGN PATENT DOCUMENTS

KR  10-2003-0084148 A  11/2003

\* cited by examiner

*Primary Examiner*—Euncha P Cherry
(74) *Attorney, Agent, or Firm*—Blakely Sokoloff Taylor & Zafman LLP

(57) ABSTRACT

Disclosed herein is a scanner motor. The scanner motor includes a rotor case for mounting a magnetic disc or polygon mirror thereon. A rotating shaft is rotatable and axially supports the rotor case. A hollow cylindrical bearing rotatably supports the rotating shaft. A bearing holder is mounted to the outer circumference of the bearing to support it. A stator is mounted to the outer circumference of the bearing holder to form an electric field which rotates the rotor case. A housing shaft is fitted over the outer circumference of the rotating shaft, seated on the rotor case, and coupled at its outer circumference to the polygon mirror. A hole is formed in the housing shaft, absorbs stress occurring during welding, and reduces variation in levelness of the polygon mirror. A coupling part couples the edge of the hole with the polygon mirror.

6 Claims, 4 Drawing Sheets

SCANNER MOTOR

CROSS REFERENCE TO RELATED APPLICATION(S)

This application claims the benefit of Korean Patent Application No. 10-2009-0061226, filed on Jul. 6, 2009, entitled "SCANNER MOTOR", which is hereby incorporated by reference in its entirety into this application.

BACKGROUND OF THE INVENTION

1. Field of the Invention

The present invention relates to a scanner motor.

2. Description of the Related Art

The present invention pertains to a scanner motor which is used in an output device using optical technology, such as a laser beam printer or a scanner, so as to rotate a polygon mirror. As the market for output devices using optical technology requires miniaturization and high speed, higher performance must be provided to an actuator for driving an optical reflecting device which has as an important part thereof a polygon mirror. Especially in high-speed rotation, measures must be taken to prevent vibration and noise.

The scanner motor is the machine which is installed in a laser beam printer or the like and rotates a polygon mirror at high speed to deflect and scan optical beams emitted from a light source. In the scanner motor, the polygon mirror rotated at high speed must be fixedly mounted to the scanner motor. A conventional scanner motor is schematically shown in FIG. 4.

As shown in FIG. 4, the conventional scanner motor 10 includes a polygon mirror 11 which is provided on the upper portion of the scanner motor 10, and a spring 12 which is used to couple the polygon mirror 11 to the scanner motor 10. Such a conventional scanner motor is disclosed in Korean Patent Laid-Open Publication No. 2003-84148.

The scanner motor 10 rotates a housing shaft 13 with force between a stator (not shown) which is mounted to the outer circumference of a bearing holder (not shown) and is thus subjected to external power, and a rotor magnet 15 which is mounted to the inner circumference of the rotor case 14.

The housing shaft 13 has the polygon mirror 11 installed thereon, with the rotor case 14 mounted to the lower portion of the housing shaft 13.

The housing shaft 13 has a disc shape, with the polygon mirror 11 mounted to the housing shaft 13. A rotating shaft 16 is inserted into the central portion of the housing shaft 13 to be secured thereto. The spring 12 is pressed against the upper surface of the housing shaft 13, thus locking the upper portion of the polygon mirror 11.

The rotor case 14 is secured to the lower surface of the housing shaft 13 through caulking, and the rotor magnet 15 is mounted to the inner circumferential wall of the rotor case 14 in such a way as to face the stator (not shown).

The polygon mirror 11 is fixedly mounted to the housing shaft 13 of the scanner motor 10 in such a way as to be rotated, and reflects laser beams in a laser beam printer or the like. Here, at least part of the upper surface of the polygon mirror 11 is pressed by the spring 12 installed to the housing shaft 13 to be secured to the housing shaft 13.

The spring 12 presses the upper surface of the polygon mirror 11 so that it is secured to the housing shaft 13.

However, the scanner motor 10 constructed as described above is problematic in that the housing shaft 13 serving as the support part of the polygon mirror 11 is mechanically machined to secure the levelness of the rotating shaft 16 and the polygon mirror 11, and coupling force between the spring 12 and the polygon mirror 11 is low, so that the spring 12 and the polygon mirror 11 may be separated from the scanner motor 10 because of strong impact transmitted from the exterior.

Further, when the scanner motor 10 including the polygon mirror 11 and several parts rotates at high speed, the position of each part is changed from its original position, thus resulting in unbalanced rotation and generating vibration and noise. Moreover, as the number of parts increases, interference between parts increases, so that vibration and noise further increase during high-speed rotation.

Thus, there is an urgent need for research into a scanner motor, which minimizes the movement of the polygon mirror 11 and interference between parts during high-speed rotation and prevents unbalanced rotation, thus reducing vibration and noise, in addition to reducing manufacturing cost.

SUMMARY OF THE INVENTION

The present invention has been made in an effort to provide a scanner motor which has low vibration and noise, enables high strength coupling, and reduces manufacturing cost.

In a scanner motor according to an embodiment of the present invention, a rotor case has a magnetic disc or polygon mirror mounted thereon. A rotating shaft is rotatable and axially supports the rotor case. A hollow cylindrical bearing rotatably supports the rotating shaft. A bearing holder is mounted to the outer circumference of the bearing to support it. A stator is mounted to the outer circumference of the bearing holder to form an electric field which rotates the rotor case. A housing shaft is fitted over the outer circumference of the rotating shaft, seated on the rotor case, and coupled at its outer circumference to the polygon mirror. At least one hole is formed in the housing shaft, absorbs stress occurring during welding, and reduces variation in levelness of the polygon mirror. A coupling part couples the edge of the hole with the polygon mirror.

The coupling part may be formed in high strength through welding using a laser welding machine.

The hole may be formed to correspond to a position of each side of the polygon mirror, and may be formed such that a plurality of holes is equal in number to a number of sides of the polygon mirror.

There may be a plurality of holes formed such that a total number of the plurality of holes is an integer multiple of a number of sides of the polygon mirror.

The hole may have a shape of a fan with an outer diameter larger than an inner diameter thereof.

The hole may have a circular shape.

The above and other objects, features and advantages of the present invention will be more clearly understood from the following detailed description taken in conjunction with the accompanying drawings.

The terminology or words used in the description and the claims of the present invention should not be interpreted as being limited merely to common or dictionary meanings. On the contrary, they should be interpreted based on the meanings and concepts of the invention in keeping with the scope of the invention on the basis of the principle that the inventor(s) can appropriately define the terms in order to describe the invention in the best way.

DESCRIPTION OF THE PREFERRED EMBODIMENTS

Figure 1:
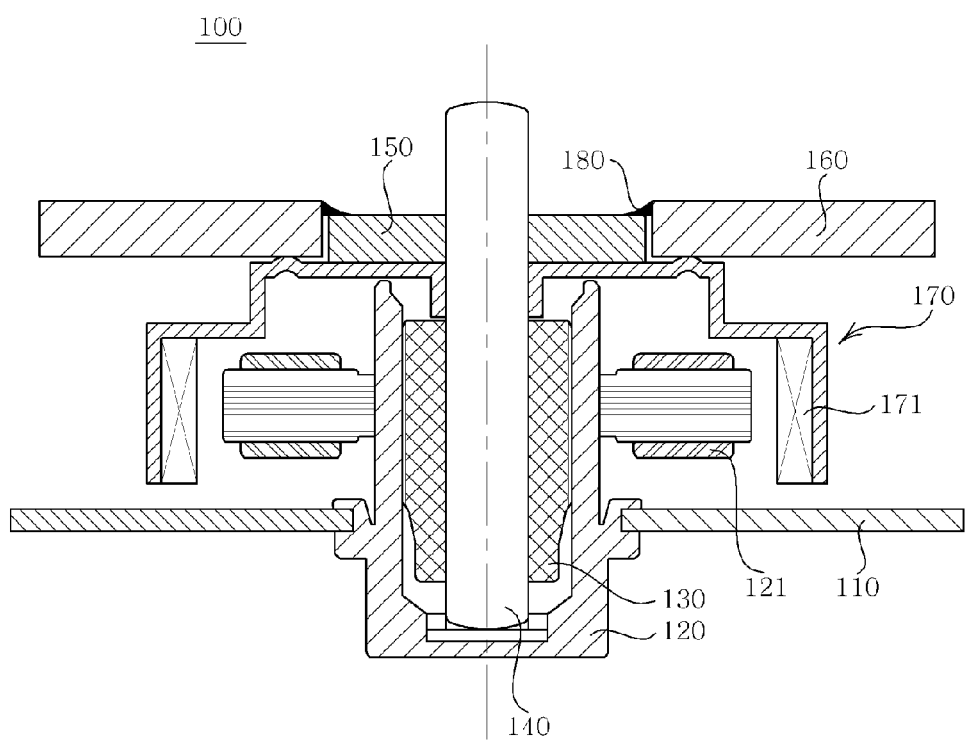
FIG. 1 is a sectional view illustrating a scanner motor according to the present invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted herein.

Hereinafter, scanner motors according to the preferred embodiments of the present invention will be described in detail with reference to the accompanying drawings.

Figure 2:
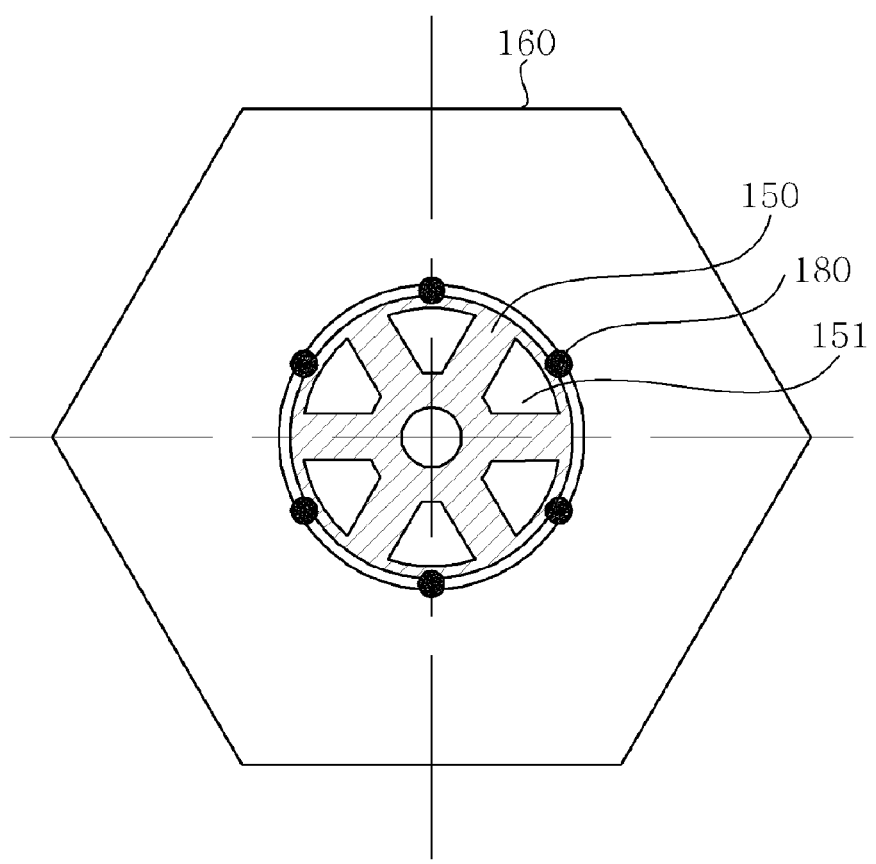
FIG. 2 is an enlarged view illustrating a housing shaft according to the first embodiment of the present invention.

FIG. 1 is a sectional view illustrating a scanner motor according to the first embodiment of the present invention, and FIG. 2 is a plan view illustrating a polygon mirror 160 and a housing shaft 150 used in the scanner motor of FIG. 1. The scanner motor 100 according to this embodiment will be described below with reference to the drawings.

As shown in FIGS. 1 and 2, the scanner motor 100 according to this embodiment includes a stationary unit and a rotary unit which is rotatably supported by the stationary unit. The stationary unit has a base plate 110, a bearing holder 120, a bearing 130 and a stator 121.

The base plate 110 functions to support the whole portion of the scanner motor 100. A circuit board (not shown) is mounted on the upper surface of the base plate 110 to electrically control the stator 121, and the bearing holder 120 is secured to the central portion of the base plate 110 in such a way as to be stepped from the upper and lower surfaces of the base plate 110.

The bearing holder 120 accommodates the bearing 130 therein to support it, and has a hollow cylindrical shape. The bearing holder 120 is fixedly coupled to the base plate 110, with the stator 121 provided on the outer circumference of the bearing holder 120.

The stator 121 is subjected to external power to form an electric field, and includes a core and a coil wound around the core.

The core is fixedly mounted to the outer circumference of the bearing holder 120. In order to achieve the thinness of the scanner motor 100, the core is preferably installed to be adjacent to the base plate 110.

The coil forms an electric field using external power, thus rotating a rotor case 170 using magnetic force between the coil and the rotor magnet 171 of the rotor case 170.

The bearing 130 functions to rotatably support the rotating shaft 140 inserted into the inner circumference of the bearing 130, and has a hollow cylindrical shape. The outer circumference of the bearing 130 is in close contact with the inner circumference of the bearing holder 120. Further, a lubricant is contained between the bearing 130 and the rotating shaft 140 to smoothly rotate the rotating shaft 140.

Meanwhile, the rotary unit includes the rotating shaft 140, the housing shaft 150, the polygon mirror 160 and the rotor case 170.

The rotating shaft 140 functions to axially support the entire rotary unit, and is inserted into the inner circumference of the bearing 130 in such a way as to be rotatably supported by the bearing 130.

The housing shaft 150 is coupled to the polygon mirror 160 via coupling parts 180 in such a way as to be rotatably driven. The housing shaft 150 is fitted over the outer circumference of the rotating shaft 140 and is mounted on the upper portion of the rotor case 170.

As shown in FIG. 2, the housing shaft 150 according to the first embodiment is made of the same material as the polygon mirror 160, namely, aluminum material, and is coupled to the polygon mirror 160 within a short period of time. Further, laser welding which has small internal stress after a coupling operation and enables high strength coupling may be used.

Holes 151 are formed in the housing shaft 150 around its central axis in such a way as to correspond to the positions of the sides of the polygon mirror 160. The holes 151 are formed such that their number is equal to the number of the sides of the polygon mirror 160 or to an integer multiple of the number of the sides of the polygon mirror 160.

The holes 151 allow stress occurring during welding to be absorbed in the housing shaft 150, thus reducing variation in levelness of the polygon mirror 160.

The shape of each hole 151 is not limited to a specific shape. However, it is preferable that each hole 151 have the shape of a fan or circle. The coupling parts 180 are provided in order to prevent the housing shaft 150 and the polygon mirror 160 from becoming separated from each other.

The coupling parts 180 are formed by welding the edges of the holes 151 to the polygon mirror 160 using a laser welding machine or by bonding the edges of the holes 151 to the polygon mirror 160 using an adhesive.

The coupling parts 180 couple the housing shaft 150 with the polygon mirror 160, thus preventing the removal of the polygon mirror 160. Therefore, unlike the conventional scanner motor, a locking member such as a spring is not required to lock the polygon mirror 160.

Thus, unbalanced deformation caused by the locking member and noise caused by interference between parts are not generated, thus achieving a scanner motor with low vibration and low noise, and reducing manufacturing cost owing to a reduction in the number of parts.

Figure 3:
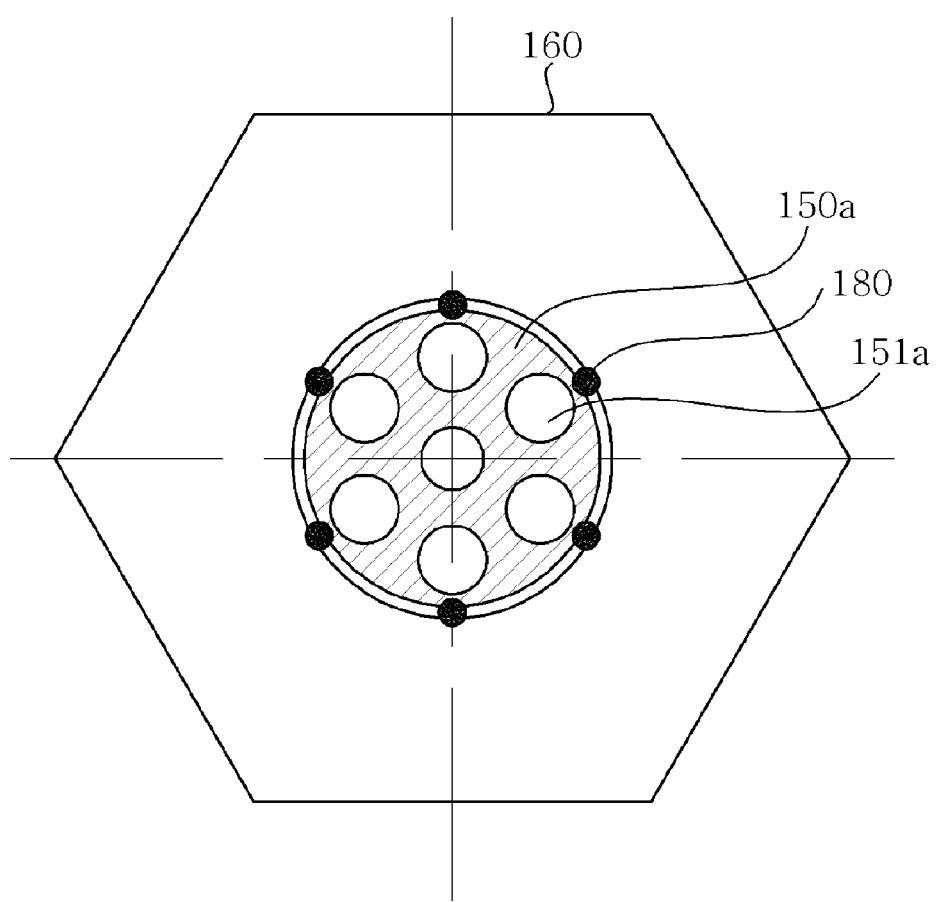
FIG. 3 is an enlarged view illustrating a housing shaft according to the second embodiment of the present invention.
Figure 4:
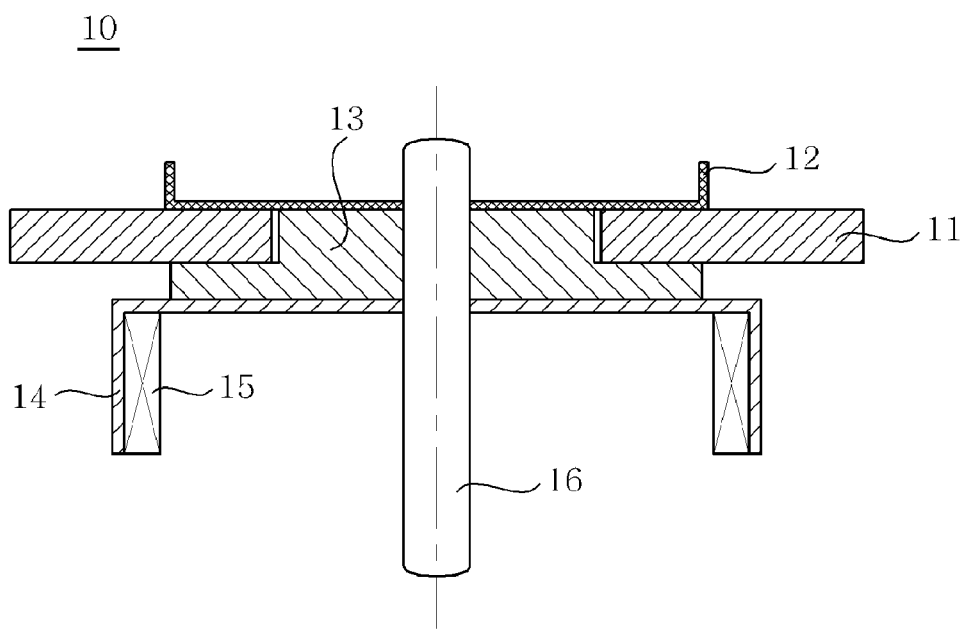
FIG. 4 is a partial sectional view illustrating a conventional scanner motor.

The polygon mirror 160 functions to deflect and scan optical beams emitted from a light source (not shown), and the central hole of the polygon mirror 160 is fitted over the outer circumference of the housing shaft 150.

housing shaft 150 according to the present invention having the same number of holes 151 as the sides of the polygon mirror 160, as shown in FIGS. 2 and 3, and the conventional housing shaft are welded, respectively, to the polygon mirror 160 through laser welding.

TABLE 1

| Data on variation in levelness of polygon mirror | | | | | | Mean value | Maximum value | Minimum value |
|---|---|---|---|---|---|---|---|---|
| The Present Invention | 0.051 | 0.062 | 0.056 | 0.055 | 0.041 | 0.040 | 0.072 | 0.132 | 0.040 |
| | 0.061 | 0.067 | 0.063 | 0.068 | 0.070 | 0.049 | | | |
| | 0.053 | 0.074 | 0.086 | 0.132 | 0.100 | 0.095 | | | |
| | 0.110 | 0.079 | 0.083 | 0.075 | 0.098 | 0.090 | | | |
| | 0.064 | 0.064 | 0.056 | 0.069 | 0.063 | 0.072 | | | |
| The Prior Art | 0.174 | 0.158 | 0.155 | 0.131 | 0.166 | 0.201 | 0.132 | 0.201 | 0.071 |
| | 0.078 | 0.116 | 0.071 | 0.133 | 0.092 | 0.083 | | | |
| | 0.109 | 0.154 | 0.118 | 0.193 | 0.156 | 0.184 | | | |
| | 0.257 | 0.078 | 0.143 | 0.089 | 0.130 | 0.072 | | | |
| | 0.132 | 0.138 | 0.149 | 0.121 | 0.126 | 0.152 | | | |

The rotor case 170 is used to install a magnetic disc or a polygon mirror thereon. The rotor case 170 rotates with an opening formed in the central portion of the rotor case 170 being fitted over the outer circumference of the rotating shaft 140. The rotor case 170 includes an upper portion for supporting the polygon mirror 160, and a side portion inside which an annular rotor magnet 171 is installed.

Preferably, the rotor case 170 is made of a magnetic material and formed through pressing.

The rotor magnet 171 is installed in the rotor case 170 in such a way as to face the stator 121, and rotates the motor using force generated between the rotor magnet 171 and the stator 121.

FIG. 3 is an enlarged view illustrating a housing shaft 150a according to the second embodiment of the present invention. Since the second embodiment remains the same as the first embodiment except that the second embodiment includes circular holes 151a, a duplicate description thereof will be omitted in this section.

The holes 151 are formed in the housing shaft 150 around its central axis in such a way as to correspond to the positions of the sides of the polygon mirror 160. The holes 151a are formed such that their number is equal to the number of the sides of the polygon mirror 160 or to an integer multiple of the number of the sides of the polygon mirror 160.

The holes 151a allow stress occurring during welding to be absorbed in the housing shaft 150, thus preventing the deformation of the rotor case 170 and reducing variation in levelness of the polygon mirror 160.

As such, in the scanner motor 100 according to the present invention, the housing shaft 150 has the holes 151, the number of which is equal to the number of the sides of the polygon mirror 160 or to an integer multiple of the number of the sides of the polygon mirror 160, and the edges of the holes 151 are welded to the polygon mirror 160, so that the holes 151 absorb stress occurring during the welding process, thus preventing the housing shaft 150 and the rotor case 170 from being deformed, and reducing variation in levelness of the polygon mirror 160.

The following [Table 1] represents experimental data on variation in the levelness of the polygon mirror 160, after the As shown in [Table 1], it can be seen that, when the scanner motor of the present invention having the housing shaft 150 in which the same number of holes 151 as the sides of the polygon mirror 160 are formed is compared with the conventional scanner motor, variation in the levelness of the polygon mirror 160 is reduced by about 40% or more when the mean value of the present invention is compared with that of the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a scanner motor, which is constructed so that the housing shaft of the scanner motor has the same number of holes as the sides of a polygon mirror, or has holes which are equal to an integer multiple of the number of the polygon mirror's sides, and the edges of the holes are welded to the polygon mirror, thus allowing the holes to absorb stress occurring during welding, preventing a housing shaft and a rotor case from being deformed, and reducing variation in the levelness of the polygon mirror.

Further, the present invention provides a scanner motor, which does not require a locking member such as a spring, thus reducing the number of parts and manufacturing cost, and preventing an unbalanced change during high-speed rotation and preventing noise from being generated due to interference between parts, therefore realizing low vibration and low noise.

Furthermore, the present invention provides a scanner motor, which absorbs stress occurring when the holes of a housing shaft are welded, thus enabling welding for high-strength coupling, such as laser welding.

What is claimed is:
1. A scanner motor, comprising:
a rotor case for mounting a magnetic disc or a polygon mirror thereon;
a rotating shaft which is rotatable and axially supports the rotor case;

a hollow cylindrical bearing for rotatably supporting the rotating shaft;

a bearing holder mounted to an outer circumference of the bearing to support the bearing;

a stator mounted to an outer circumference of the bearing holder to form an electric field which rotates the rotor case;

a housing shaft fitted over an outer circumference of the rotating shaft and seated on the rotor case, the housing shaft being coupled at an outer circumference thereof to the polygon mirror;

at least one hole formed in the housing shaft, absorbing stress occurring during welding, and reducing variation in levelness of the polygon mirror; and a coupling part for coupling an edge of the hole with the polygon mirror.

2. The scanner motor as set forth in claim 1, wherein the coupling part is formed through welding using a laser welding machine.

3. The scanner motor as set forth in claim 1, wherein the hole is formed to correspond to a position of each side of the polygon mirror, and is formed such that a plurality of holes is equal in number to a number of sides of the polygon mirror.

4. The scanner motor as set forth in claim 1, wherein there is a plurality of holes formed such that a total number of the plurality of holes is an integer multiple of a number of sides of the polygon mirror.

5. The scanner motor as set forth in claim 1, wherein the hole has a shape of a fan with an outer diameter larger than an inner diameter thereof.

6. The scanner motor as set forth in claim 1, wherein the hole has a circular shape.

* * * * *